United States Patent [19]

Jansen et al.

[11] Patent Number: 5,015,321

[45] Date of Patent: May 14, 1991

[54] ADHESIVE AND ITS USE FOR PRODUCING ADHESIVE BONDS

[75] Inventors: Bernhard Jansen, Cologne; Hanns P. Müller, Bergisch-Gladbach; Rudolf Hombach, Leverkusen, all of Fed. Rep. of Germany

[73] Assignee: Bayer Aktiengesellschaft, Bayerwerk, Fed. Rep. of Germany

[21] Appl. No.: 373,359

[22] Filed: Jun. 29, 1989

Related U.S. Application Data

[63] Continuation of Ser. No. 145,785, Jan. 15, 1988, abandoned.

[30] Foreign Application Priority Data

Jan. 23, 1987 [DE] Fed. Rep. of Germany ....... 3701888

[51] Int. Cl.$^5$ .......................... C09J 4/04; C08L 51/08
[52] U.S. Cl. ............................... 156/331.7; 428/423.1; 525/63
[58] Field of Search ...................... 156/331.7; 525/63; 428/423.1

[56] References Cited

U.S. PATENT DOCUMENTS

| | | | |
|---|---|---|---|
| 3,383,351 | 5/1968 | Stamberger | 260/33.2 |
| 4,218,543 | 8/1980 | Weber et al. | 521/51 |
| 4,230,823 | 10/1980 | Alberts et al. | 521/137 |
| 4,324,716 | 4/1982 | Reischl et al. | 524/761 |
| 4,511,626 | 4/1985 | Schumacher | 428/425.6 |
| 4,532,316 | 7/1985 | Henn et al. | 528/59 |
| 4,539,345 | 9/1985 | Hansen | 523/219 |
| 4,668,708 | 5/1987 | Mueller et al. | 521/159 |

FOREIGN PATENT DOCUMENTS

| | | | |
|---|---|---|---|
| 0275908 | 7/1988 | European Pat. Off. | 156/331.7 |
| 3326566 | 1/1985 | Fed. Rep. of Germany. | |
| 0293284 | 12/1986 | Japan | 156/331.7 |

OTHER PUBLICATIONS

L. P. Rumao, J. Macromol, Science-Revis, Macromal Chem., 5/1, pp. 103–150, 1970.
M. Dollhausen, W. Warrach, "Polyurethane Adhesives Technology, Adhesives Age", Jun., 1982, p. 28.
A. Farkas and C. Z. Mills, Advanced Catalysis, 13, 393, 1962.
J. H. Saunders and K. C. Frisch, Polyurethane Part I, Wiley-Interscience, N.Y., 1962, Chapter VI.

*Primary Examiner*—Ana L. Carrillo
*Attorney, Agent, or Firm*—Joseph C. Gil; Aron Preis

[57] ABSTRACT

A moisture cured adhesive comprising a reaction product of an organic polyisocyanate and an organic polyhydroxyl component which comprises at least one polyether polyol which has been modified by radical polymerization or copolymerization with an olefinically unsaturated monomer is disclosed. The reaction product is characterized in that it contains about 2.5 to about 25% by weight of free isocyanate groups and in that the proportion of polymers or copolymers present in the organic polyhydroxyl component is about 1 to about 50 weight % based on the weight of the components. The adhesive in accordance with the invention is characterized by its superior shear strength.

8 Claims, No Drawings

ADHESIVE AND ITS USE FOR PRODUCING ADHESIVE BONDS

This application is a continuation of application Ser. No. 07/145,785 filed Jan. 15, 1988, abandoned.

FIELD OF THE INVENTION

This invention relates to adhesives based on products containing free isocyanate groups obtained from the reaction of excess quantities of organic polyisocyanates and organic polyhydroxyl compounds modified by the polymerization or copolymerization of olefinically unsaturated monomers, and the use of these adhesives for the formation of bonds between any substrates.

SUMMARY OF THE INVENTION

It has now surprisingly been found that prepolymers containing free isocyanate groups and based on excess quantities of organic polyisocyanates and certain polyhydroxyl compounds described below which are modified with polymers or copolymers of olefinically unsaturated monomers are particularly valuable binders for one-component adhesives which produce bonds with excellent shear strengths.

The present invention relates to adhesives which are hardened by atmospheric moisture, comprising
(a) a reaction product, containing from 2,5 to 25% by weight of free isocyanate groups, of
 (a1) at least one organic polyisocyanate and
 (a2) at least one filled organic polyhydroxyl component and optionally
(b) the usual auxiliary agents and additives characterised in that component a2 is a dispersion containing
 (1) a polyether polyol,
 (2) a polymer of olefinic monomers polymerized by radical polymerisation,
 (3) a graft polyether obtained from the polyether polyol by grafting thereon a polymer consisting of olefinic monomers polymerised by radical polymerisation, and
 (4) optionally further organic polyhydroxyl compounds, the dispersion having been prepared by polymerisation of the monomers in the polyether polyol,
and the content of the polymerised olefinic monomers being 1–50% by weight, preferably 2,5–50% by weight, based on the total weight of a2.

The present invention also relates to the use of these adhesives to form bonds on any substrate.

BACKGROUND OF THE INVENTION

It has long been known to use polyisocyanates or polyisocyanate preparations, in particular, polyurethane prepolymers containing free isocyanate groups as adhesives. The use of these adhesives is recorded in the literature: M. Dollhausen, W. Warrach, Polyurethane Adhesives Technology, Adhesives Age, June 1982, Page 28; R. Jordan, Polyurethane als Klebstoffe, Seifen, Öle, Fette, Wasche, 109 (1983), No. 11/12, Pages 333–336; B. Fortschritte in den 80er, Jahren, Adhesion 28 (1984), No. 3, Pages 7–12; B. Kujawa-Penczek, P. Penczek, S. Osiecki, Adhasion 28 (1984) No. 6, Pages 30–32.

It is known to react organic polyisocyanates with subequivalent quantities of organic polyhydroxyl compounds consisting at least partly of "graft polyethers" to form isocyanate prepolymers. By "graft polyethers" are meant polyether polyols which have been prepared by radical polymerization or copolymerization of olefinically unsaturated monomers in the polyether polyol used as reaction medium. Such isocyanate prepolymers are described, for example, in DE-OS 3,519,692 and in U.S. Pat. No. 3,383,351. The prior publications, however, give no indication that such isocyanate prepolymers are excellent binders for one-component adhesives. They deal with the production of polyurethane foams, inter alia by the prepolymer process using the above-mentioned isocyanate prepolymers.

DE-A 2,638,759 and EP-A 008 444 already disclose how to prepare filled polyols. DE-A 2,638,759 describes polyurea containing polyols, whereas EP-A 008 444 describes polyols containing polymers of olefinically unsaturated compounds as fillers. Filled polyols are also known from Oertel, Kunststoffhandbuch plastics Manual No. 7, Polyurethane, 1983, Carl-Hanser Verlag, Munich, Vienna, page 76.

DETAILED DESCRIPTION OF THE INVENTION

Component (a1) on which the adhesives according to the invention are based consists of at least one compound containing at least 2 organically bound isocyanate groups per molecule. These include both low molecular weight polyisocyanates having a molecular weight below 400 and modified products of such low molecular weight polyisocyanates obtainable by processes known in the art from low molecular weight polyisocyanates such as isocyanurates, biurets, allophanates, carbodiimides or uretdiones. Suitable low molecular weight polyisocyanates include, for example, those corresponding to the formula $$Q(NCO)_n$$

wherein $n = 2$ to 4, preferably 2,
and Q denotes
—an aliphatic hydrocarbon group containing 2 to 18, preferably 6 to 10 carbon atoms, a cycloaliphatic hydrocarbon group containing 4 to 15, preferably 5 to 10 carbon atoms,
—an aromatic hydrocarbon group containing 6 to 15, preferably 6 to 13 carbon atoms,
—or an araliphatic hydrocarbon group containing 8 to 15, preferably 8 to 13 carbon atoms.

The following are examples of such low molecular weight polyisocyanates: hexamethylenediisocyanate, 1,12-dodecanediisocyanate, cyclobutane-1,3-diisocyanate, cyclohexane-1,3- and -1,4-diisocyanate and any mixtures of these isomers, 1-isocyanato-3,3,5-tri-methyl-5-isocyanatomethyl-cyclohexane, hexahydro-1,3- and-/or -1,4-phenylene diisocyanate, perhydro-2,4'-and/or -4,4'-diphenylmethane diisocyanate, 1,3- and 1,4-phenylene diisocyanate, 2,4- and 2,6-tolylene diisocyanate and any mixtures of these isomers, diphenylmethane-2,4'- and/or -4,4'-diisocyanate, naphthylene-1,5-diisocyanace, triphenylmethane-4,4', 4"-triisocyanate and polyphenyl-polymethylene polyisocyanates, which are obtainable by anilineformaldehyde condensation followed by phosgenation. The known polyisocyanates and polyisocyanate mixtures of the diphenylmethane series are preferably used as component al). These include both 4,4'-diisocyanato-diphenylmethane and mixtures thereof with 2,4'-diisocyanatodiphenylmethane optionally with minor quantities of 2,2'-diisocyanatodiphenylmethane and mixtures of these isomers with their higher homologues which are obtainable in known manner by the phosgenation of aniline-formaldehyde condensates. Polyisocyanates and polyisocyanate mixtures of the diphenylmethane series which have been modified by partial urethanization of the isocyanate groups of the aforesaid isocyanates are also preferred.

Component (a2) consists of filled polyols comprising "graft polyethers" or mixtures thereof with the usual polyhydroxyl compounds used in polyurethane chemistry, such as those disclosed, for example, in U.S. Pat. No. 4,218,543, column 7, line 29 to column 9, line 25 incorporated herein by reference.

The "graft polyethers" are preferably polyether polyols which in their unmodified form have a molecular weight (average) of from 500 to 000, preferably from 1000 to 6000, calculated from their functionality and their hydroxyl group content, and which have been modified by radical polymerization or copolymerization of olefinically unsaturated monomers in the polyether polyol used as reaction medium. The polymers obtained from this polymerization or copolymerization reaction are at least partly present in the form of true graft polymers in the polyether polyols although the possibility cannot be excluded that the preparation of the "graft polyethers" is accompanied by the formation of a certain amount of polymers or copolymers by radical polymerization or copolymerization in situ, these polymers and copolymers being then present in admixture with the polyether component.

The preparation of "graft polyethers" may be carried out by known means, for example, in accordance with EP-A-0,008,444 which is incorporated herein by reference, by using the polyether polyols and the olefinically unsaturated monomers mentioned there. For the purpose of the present invention, it is preferred to use "graft polyethers" which have been prepared from acrylonitrile or mixtures of acrylonitrile and styrene as olefinically unsaturated monomers, acrylonitrile and styrene being used in proportions by weight in the range of from 20:80 to 100:0.

Component (a2) consists either of pure "filled polyols", of the type mentioned above or mixtures thereof with other polyhydroxyl compounds known from polyurethane chemistry such as those disclosed, for example, in the incorporated by reference U.S. Pat. No. 4,218,543. Particularly suitable polyhydroxyl compounds used in admixture with the pure graft polyethers are simple polyhydric alcohols in the molecular weight range of from 62 to 599, preferably from 62 to 200, such as ethylene glyco,, trimethylol propane, propane-1,2-diol or butane-1,2-diol and/or polyether polyols and/or polyester polyols of the kind known from polyurethane chemistry which have molecular weights in the range of from 600 to 8000, preferably from 800 to 4000, and which have at least 2, generally 2 to 8, preferably 2 to 4, primary and/or secondary hydroxyl functions, these compounds may be prepared in accordance with U.S. Pat. No. 4,218,543 or by analogous methods.

If component (a2) consists of mixtures of "graft polyethers" and unmodified polyhydroxyl compounds, then any mixtures of this kind may be used, provided that the proportion of polymers or copolymers in these mixtures is within the limits stated above.

The auxiliary agents and additives (b) optionally present in the adhesives according to the invention are known substances used in polyurethane chemistry. Examples of suitable components (b) include the solvents commonly used in the technology of adhesives and lacquers, e.g. toluene, xylene, ethyl acetate, butyl acetate, methylethyl ketone, methylisobutyl ketone, monoethylether acetate or any mixtures of such solvents.

Other substances which may be added as components (b) are, for example, pigments, fillers including inorganic fillers such as barium sulphate, calcium carbonate, quartz, chalk, precipitated silica, talc, zinc oxide etc. and levelling agents and surface active substances.

The substances which may be used as components (b) also include catalytically active substances of the kind normally used in polyurethane chemistry. A survey of commonly used catalysts and their mode of action is given in the literature: A. Farkas and C. A. Mills, Advanced Catalysis, 13, 393 (1962); J. H. Saunders and K. C. Frisch, Polyurethanes, Part 1, Wiley-Interscience, New York 1962; Chap. VI, L. P. Rumao, J. Macromol. Sci.-Revs. Macromol. Chem. 5/1, 103–150 (1970), all incorporated herein by reference.

Particularly preferred catalysts are the complexes and addition products of tin compounds and p-toluene sulphonyl-isocyanate described in DE-OS 3,326,566, which may be prepared in situ from their individual components in the prepolymer.

For the preparation of the isocyanate prepolymers (a), the individual components (a) and (a2) are reacted together at temperatures in the range of about 30° to 80° C. in proportions corresponding to an NCO/OH equivalent ratio in the range of about 1.5:1 to 20:1, preferably 5:1 to 15:1. The isocyanate prepolymers obtained by this method have an isocyanate content of from 2.5 to 25% by weight, preferably from 6 to 20% by weight, and a molecular weight (average) of about 400 to 30,000 preferably from 600 to 20,000, in particular from 800 to 10,000.

From the figures given above concerning the equivalent ratio it is clear that in the context of the present invention the terms "isocyanate prepolymers" and "prepolymers with isocyanate end groups" are used both for the reaction products as such and for their mixtures with excess quantities of unreacted starting polyisocyanate, which mixtures are frequently referred to as "semi-prepolymers".

The isocyanate prepolymers prepared as described above are themselves adhesives according to the invention even without the aid of auxiliary agents and additives (b) but may optionally be further modified by the addition of auxiliary agents and additives b) of the type exemplified above.

The adhesives according to the invention have a very high storage stability when stored in the absence of moisture and they are relatively low viscosity substances which are easily processed. The "open time" of the adhesives and the speed of drying of the adhesive layers formed from the adhesives may readily be adapted by the quantity of catalysts.

The adhesives according to this invention are suitable for bonding any substrates, including, for example, wood, metals, textiles and a wide variety of plastics but are especially suitable for bonding glass fiber reinforced polyester resins to similar substances or to other materials. The bonds obtained with the adhesives according to the invention are particularly distinguished by their excellent shear strength.

The adhesives according to the invention are also suitable for use as or for the preparation of air cured coating compounds on any substrates as the hardened surface materials produced from the adhesives have the character of high quality lacquer coatings.

The adhesive and coating compounds according to the invention are applied by the usual methods of the technology of adhesives and coatings.

The invention is further illustrated but is not intended to be limited by the following examples in which all parts and percentages are by weight unless otherwise specified.

EXAMPLES

Abbreviations used hereinafter:

Crude MDI 4,4'-diisocyanatodiphenylmethane as a mixture with its isomers and higher homologues, as obtained by the phosgenation of aniline-formaldehyde condensates; NCO-content: 30.4%, viscosity at 25° C.: 80 mPas.

DBTL

Dibutyl tin dilaurate

TosNCO p-toluene sulphonyl isocyanate

Filled polyol 1

400 g of a polyol/polyoxypropylen triol started on trimethylolpropane as the starter and containing 17% by weight of terminal polyoxyethylene blocks and having a content of more than 70% of primary OH groups, based on the total hydroxyl content, and an OH number of 35 are initially introduced into an apparatus consisting of a three-necked flask equipped with a dropping funnel, a reflux condenser, as gas inlet tube and a stirrer and are heated to 120° C. under a nitrogen atmosphere. A mixture of 400 g of the same polyol, 120 g of acrylonitrile, 80 g of styrene and 1.2 g of azobiisobutyronitrile (0.6% based on the monomers) is added via the dropping funnel over a period of 2.5 hours; then the temperature is kept in the range of 120°-130° C. After the addition is complete the reaction mixture is stirred for a further 2 hours and is finally distilled to remove the residual monomers at a vacuum of 14 mmHg. The distillation yielded only a few grams of distillate; the solids content corresponds to 20%. The dispersion is very finely divided and has an OH number of 28 mg KOH/g.

Filled polyol 2

800 g of the polyol from Example 1 are initially introduced together with 44.4 g of hydrazine monohydrate (99%), at room temperature and under a nitrogen atmosphere, into an apparatus consisting of a three-necked flask equipped with a dropping funnel, a reflux condensed, a gas inlet tube and a stirrer. The isocyanate (toluylene diisocyanate; ratio of 2,4-to 2,6-isomers; 4:1) is added slowly dropwise; during this addition the temperature is kept at 25° C. by cooling with an ice bath. A very finely-divided dispersion is obtained with intensive stirring. When the addition is complete the hydrate water is distilled off under a water-jet vacuum at 25° to 50° C. The finished dispersion has a solids content of 20% and an OH number of 28 mg KOH/g.

Filled polyol 3

This filled polyol is prepared following the same procedure as in example 1. A polyether polyol with an OH number of 45 mg KOH/g was used as the starting polyol. It was prepared by propoxylation trimethylolpropane, subsequently alkoxylating the propoxylation product with a mixture of equal parts by weight of ethylene oxide and propylene oxide and finally reaction of the resulting intermediate product with propylene oxide (weight ratio of PO: (PO:EO): PO=60:30:10). A mixture of styrene and acrylonitrile in a weight ratio of 20:80 is used as the monomer in such a quantity that the resulting filled polyol has a polymer content of 35%. The hydroxyl number of the filled polyol is 28.5 mg KOH/g.

PREPARATION OF ADHESIVES ACCORDING TO THE INVENTION

Example 1

Polyether 1=polypropyleneglycol having a hydroxyl number of 56 mg KOH/g.

100 g of crude MDI are introduced into a reaction vessel at 60° C. and 100 g of the filled polyol 1 are then added at such a rate that the reaction temperature does not exceed 65° C. After a reaction time of 3 hours, an isocyanate content of 14% is obtained. The viscosity at 25° C. is 5208 mPas (clear product).

0 5 parts of DBTL and 0.63 parts of TosNCO are added for catalysis.

Example 2 (Comparison)

100 g of crude MDI are introduced into a reaction vessel at 60° C. and 100 g of the filled polyol 2 are then added at such a rate that the reaction temperature does not exceed 65° C.

After a reaction time of 2 hours 10 minutes, an isocyanate content of 13.2% is obtained and the viscosity at 25° C. is 12,608 mPas (milky cloudy product).

0.5 parts of DBTL and 0.63 parts of TosNCO are added for catalysis.

Example 3 (Comparison)

100 g of crude MDI are introduced into a reaction vessel at 60° C. and 100 g of polyol 1 are then added at such a rate that the reaction temperature does not exceed 65° C. After 2½ hours, an isocyanate content of 13.4% is obtained, and the viscosity is 7500 mPas (25° C.).

0 5 parts of DBTL and 0.63 parts of TosNCO are added for catalysis.

Example 4

125 g of crude MDI are introduced into a reaction vessel at 60° C. and a mixture of 100 g of the filled polyol 1 and 50 g of Polyether 1 are added at such a rate that the reaction temperature does not exceed 65° C. After 3 hours and 40 minutes, an isocyanate content of 12.2% is obtained and the viscosity is 6456 mPas (25° C.).

0.5 parts of DBTL and 0.63 parts of TosNCO are added for catalysis.

Example 5 (Comparison)

125 g of crude MDI are introduced into a reaction vessel at 60° C. and a mixture of 100 g of the filled polyol 2 and 50 g of Polyether 1 is then added at such a rate that the reaction temperature does not exceed 65° C. After 3 hours and 40 minutes, an isocyanate content of 12.1% is obtained and the viscosity is 13,433 mPas (25° C.).

0.5 parts of DBTL and 0.63 parts of TosNCO are for catalysis.

Example 6

80 g of crude MDI are introduced into a reaction vessel at 60° C. and a mixture of 41.8 g of the filled polyol 3 and 41.7 g of Polyether 1 is then added at such a rate that the reaction temperature does not exceed 65° C. After 5 hours and 20 minutes, an isocyanate content of 13.6% is obtained and the viscosity is 6248 mPas (25° C.).

0.5 parts of DBTL and 0.63 parts of TosNCO are added for catalysis.

USE ACCORDING TO THE INVENTION

Example 7

Adhesive bonds are produced on test samples of glass fiber reinforced polyester resins (30% glass content) -SMC- using the adhesives of Examples 1 to 6. The samples, measuring 2×4×0.3 cm. are lightly rubbed down with glass paper and held over boiling water for about 2 seconds to enable the moisture required for the reaction to condense on the surface (this measure is employed only to ensure completely comparable test conditions; in normal circumstances, the quantity of water adhering to the substrates due to the atmospheric moisture is sufficient for hardening). After application of the adhesives with a brush to form a layer 0.15 mm in thickness on the surface of one of the two test samples to be bonded together, the samples are placed together to form an overlapping area of 2 cm². The samples are then pressed together at a pressure of 0.3 MP. The shear strength (DIN 53 282) is determined at a spindle feed of 100 mm/Min. after 1 hour, 3 hours and 24 hours.

The film drying times and shear strengths are summarized in the following table.

| Example No. | Film Drying Time at 50% relative humidity and 23° C. (Min.) | Shear strength S M C after (N/mm²) | | |
|---|---|---|---|---|
| | | 1 Hr. | 3 Hrs. | 24 Hrs. |
| 1 | 40 | 3.4 | 6.3 | 11.5 |
| 2 (Comparison) | 38 | 2.2 | 4.3 | 8.0 |
| 3 (Comparison) | 35 | 3.0 | 5.5 | 8.5 |
| 4 | 40 | 2.6 | 6.5 | 14.0* |
| 5 (Comparison) | 50 | 3.0 | 4.5 | 8.0 |
| 6 | 30 | 2.7 | 8.0 | 11.2* |

*with breakage of material.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for bonding a first substrate to a second substrate comprising applying a moisture curable adhesive to said first substrate and placing said second substrate together with said first substrate with said adhesive positioned therebetween said adhesive comprising the reaction product of
   (i) at least one organic polyisocyanate,
   (ii) at least one filled polyol, said filled polyol comprising
   (1) a polyether polyol,
   (2) the radical polymerization product of (a) acrylonitrile or (b) a mixture of styrene and acrylonitrile and
   (3) a product obtained by grafting at least some of said (2) on said (1), said radical polymerization product being present in an amount of 1-50% relative to the weight of said filled polyol, said reaction product being characterized in that it contains 2.5 to 25% by weight of free isocyanate groups.

2. The method of claim 1 wherein said radical polymerization product is polyacrylonitrile.

3. The method of claim 1 wherein said organic polyisocyanate has a molecular weight of below 400.

4. The method of claim 1 wherein said polyisocyanate is a modified polyisocyanate selected from the group consisting of isocyanurate, biuret, allophanate, carbodiimide and uretdione.

5. The method of claim 1 wherein said polyether polyol has a number average molecular weight of from 500 to 9000.

6. The method of claim 1 wherein said polyisocyanate conforms to $$Q(NCO)_n$$

wherein n is from 2 to 40,
Q is $C_2$–$C_{18}$ aliphatic hydrocarbon group, $C_4$–$C_{15}$ cycloaliphatic hydrogen group, $C_6$–$C_{15}$ aromatic hydrocarbon group or a $C_8$–$C_{15}$ araliphatic hydrocarbon group.

7. The method of claim 1 wherein said radical polymerization product consists essentially of acrylonitrile.

8. The method of claim 1 wherein said radical polymerization product consists essentially of a mixture of acrylonitrile and styrene wherein said styrene is present in an amount of up to 80 weight percent of said mixture.

* * * * *